Figure 4:
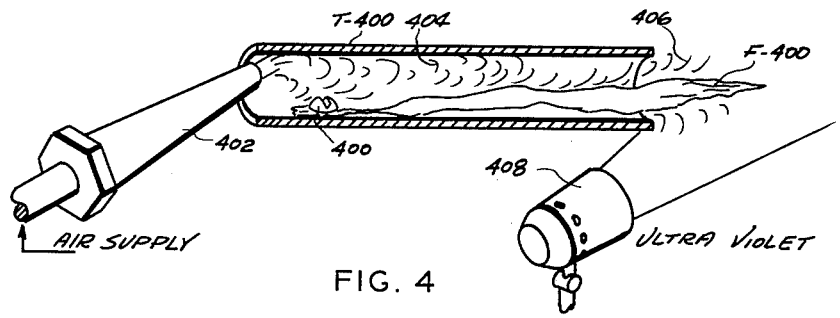

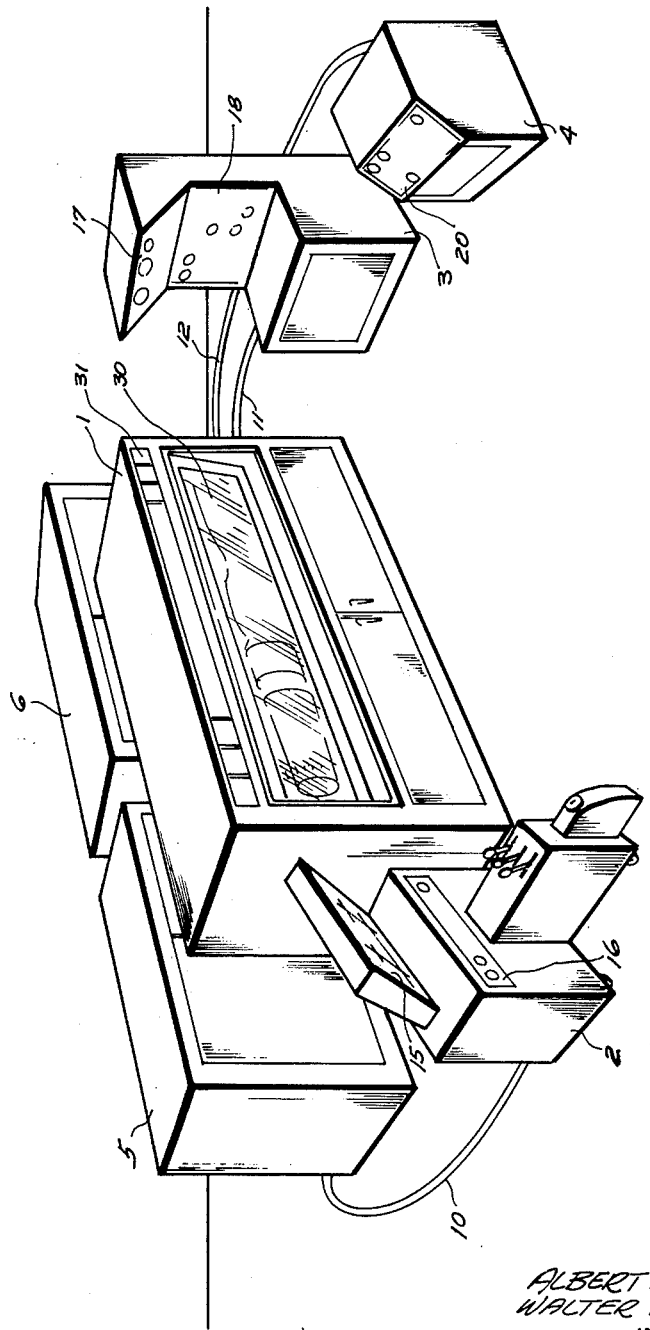

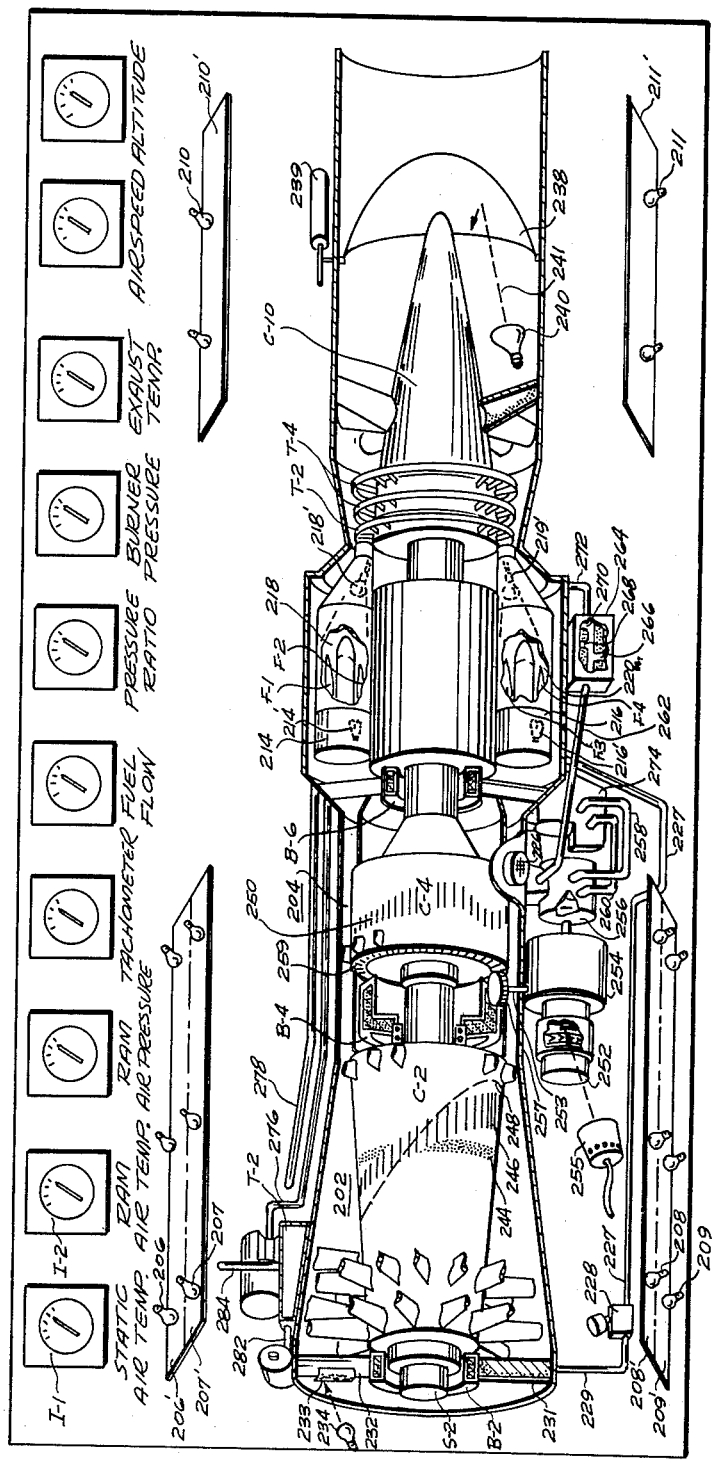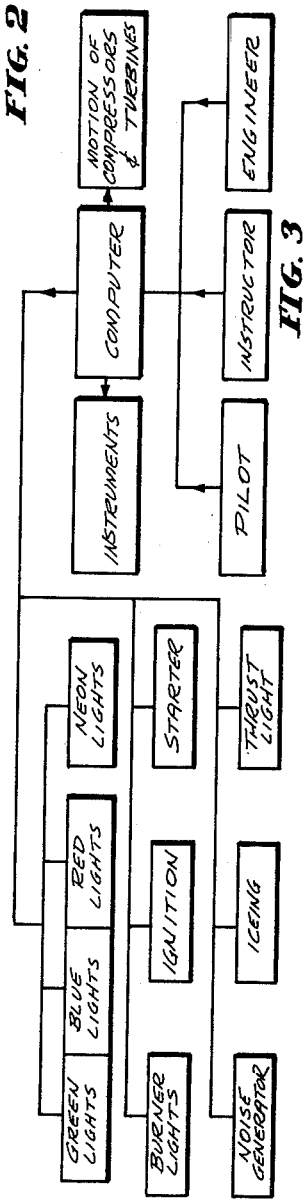

ALBERT J. RIDER
WALTER A. RANDALL
INVENTOR

BY Delbert O. Warner
ATTORNEY

United States Patent Office 3,031,776
Patented May 1, 1962

3,031,776
AIRCRAFT ENGINE SIMULATION
Walter A. Randall, Binghamton, and Albert J. Rider, Greene, N.Y., assignors to Link Aviation, Inc., Binghamton, N.Y., a corporation of New York
Filed Nov. 12, 1959, Ser. No. 852,544
11 Claims. (Cl. 35—13)

The present invention relates to aircraft engine simulators. More particularly, it relates to jet engine simulators which provide an animated visual display to illustrate the operation of jet engines in response to the operation of simulated controls and also to illustrate the operation of means for simulating malfunctions of engines and for correcting the malfunctions.

The increasing complexity of modern aircraft has increased the need for more highly trained personnel in all phases of the industry, from maintenance personnel to pilots. This need has resulted in proposals for aircraft engine simulators upon which the various personnel concerned may be trained in the operation of the aircraft and particularly the aircraft engines in order to better fit them to operate the engines and to determine when an engine is due for certain corrective measures which can assure its continued operation. In the past, the jet engine trainers which have been proposed have consisted of two dimensional pictures to which a lighting system and various visual instrument indicators are connected such that operation of the lights and the indicators will portray the occurrence of various events. Simulators of this kind are undoubtedly of help in teaching how the jet engine operates and in indicating which parts of the engine are at fault when various failures, or symptoms of impending failures, occur. The lack of a three dimensional portrayal of the engine showing the interrelationships of the various components and providing animation of the movable components as well as sound effects and light effects suitable to portray the occurrence of various events represents a serious limitation on these proposals however. It is particularly difficult to show the effects of many of the operations which may be performed upon a jet engine to modify its operation as, for example, the injection of water into the combustion chamber, or the removal of air for the operation of auxiliary equipment such as deicing equipment. Certain other effects which are very difficult to show without animation include the affects produced by such things as flame-out, hot starts, thrust reversal, and ignition failure.

The alternatives to the use of jet engine simulators in the instruction of personnel include the usual books, lectures, cut-away models of jet engines and test runs on actual engines. The use of lectures and textbooks is, of course, basic and need not be discussed. The use of cut-away models for demonstrating the internal appearance of a jet engine is very helpful in the early training stages, but it is very seriously limited by the fact that only the static condition of the engine usually can be shown in this way, and even where the cut-away model is animated, little more than the basic motion of the components of a jet engine can be shown. The use of a full scale jet engine to train personnel in operation and maintenance is also limited very greatly; first by the fact that very little of the operation of an engine under actual operating conditions can be observed and secondly the use of an expensive engine in this fashion for demonstration purposes is extremely wasteful, particularly when it is recognized that the simulation of certain kinds of malfunctions may actually damage the engine just as they would if it were operating in an aircraft.

It is an object, therefore, of this invention to provide an aircraft engine simulator capable of conveying to the observer an understanding of the operation of a jet engine under all operating conditions of conveying an impression of what happens when various malfunctions occur, and of providing training means to enable the observer to correct the malfunction.

It is a further object of this invention to provide improved means for instructing students in the operation and maintenance of jet engines without danger or injury to the students or to "live" jet engines.

It is another object of this invention to provide improved training means for instructing in the operation and maintenance of jet engines which does away with interruptions in the training cycle due to conditions such as inclement weather or the non-availability of actual engines or aircraft which may be studied.

It is yet another object of this invention to provide in a jet engine trainer means for changing the intensity of light, the color of the light, and the speed of operation of the various components in a fashion which will make it possible to illustrate the complete cycle of engine operations while an engine is functioning properly and to illustrate the effects of malfunctioning.

It is still another object of this invention to provide a jet engine simulator incorporating a three-dimensional animated model, the motion of which and the lighting of which will change to represent various changes in the operation of the engine brought about by changes in the settings of various controls by an instructor and by students.

It is a further object of this invention to provide means for making it possible for a student to learn to correct for certain malfunctions of a jet engine, including lighting and speed control means to represent the malfunctioning and means subject to control by the student for correcting said malfunctions.

It is yet an additional object of this invention to provide means to enable a student to observe the changes which occur in the internal elements of a jet engine whenever changes are made in any of the factors controlling the engine.

It is still another object of this invention to provide by direct three-dimensional illustration an accurate representation of the significant changes which occur in a jet engine during normal operating cycles as well as during periods of malfunctions and specifically to illustrate changes in such things as the combustion chamber and in the deicing devices.

The foregoing objects and others ancillary thereto may be accomplished by a preferred embodiment of the invention. This preferred embodiment includes a cut-away scale model of a jet engine, portions of which are animated, and other portions of which are provided with suitable lighting means and/or indicators to indicate that they are functioning and other portions of which are merely mocked up. The lights on the cut-away model, the motive means of the model and the indicators or instruments are subject to direct control by a computer which, in response to various conditions imposed upon it by students and an instructor, provides electrical signals to them representative of the operation of an actual jet engine. The electrical signals in question are supplied to the lighting control means, to the instruments and to means for controlling the motive means on the model to cause these means to react to provide the lighting, the instrument readings and the motion required to represent the operation of the actual jet engine.

Figure 5:
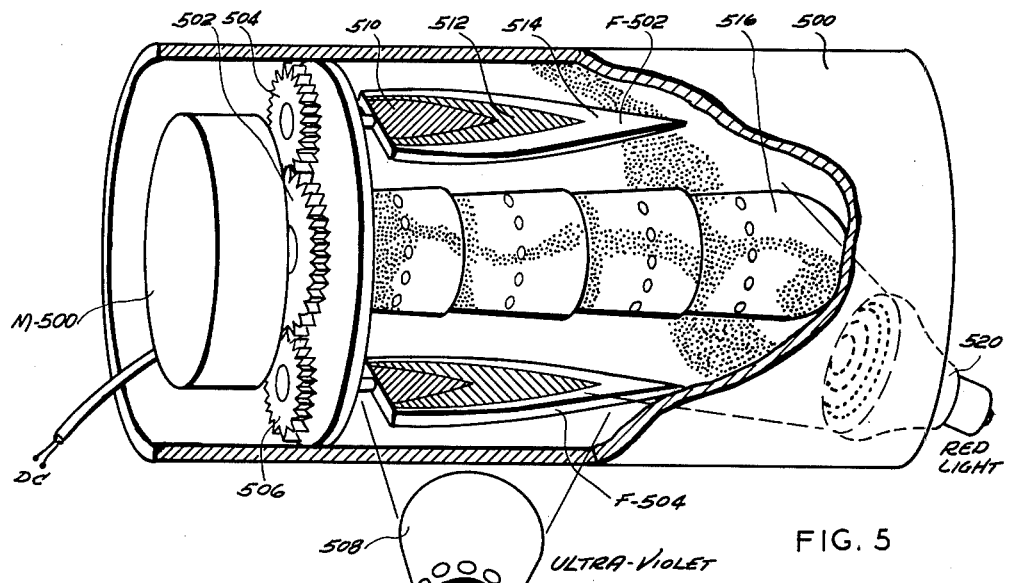
Figure 6:
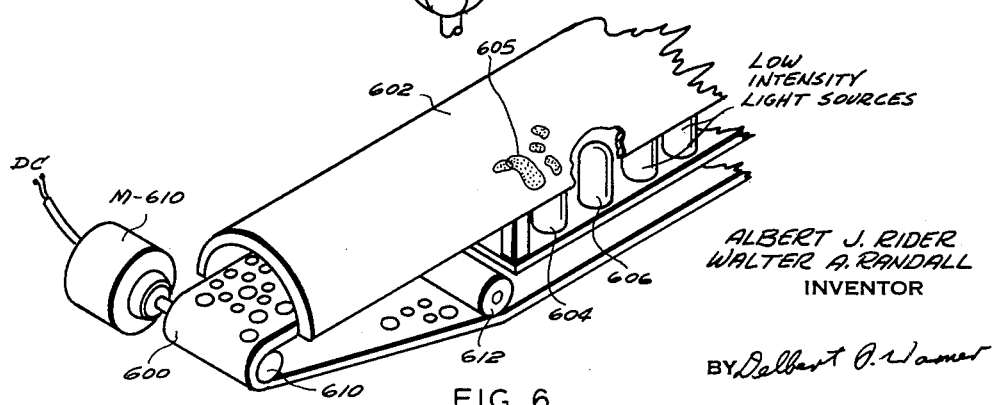

The novel features that I consider characteristic of my invention are set forth with particularity in the appended claims. The invention itself, however, both as to its organization and its method of operation, together with additional objects and advantages thereof, will best be understood from the following description of the specific embodiment when read in connection with the accompanying drawings, in which:

FIG. 1 is a perspective view of an embodiment of the invention illustrating the use of computer cabinets and instrument and control cabinets along with a model of a jet engine housed in a cabinet, FIG. 2 is a front-view of the jet engine cabinet showing a model jet engine with cut-away portions and the principal instrument readings which are available, FIG. 3 shows a simplified block diagram which illustrates some of the interrelationships between the computer elements, the human operators, the instruments, and the various elements providing the visual simulation, FIGS. 4 and 5 illustrate means for simulating a flame in the combustion chamber of a jet engine, FIG. 6 illustrates means for simulating the flow of liquid in a pipe, and FIGS. 7, 8A, 8B, 9A and 9B are views of various embodiments of flames useable with the instant invention.

Turning first to FIG. 1, we find illustrated a group of six cabinets, which together illustrate the essential components of the instant invention. The components labelled 1, 2, 3 and 4 represent respectively engine display console, the pilot's station, the system's engineer's station, and the instructor's station. These components generally are of such construction as to represent the equipment existing in an actual jet aircraft. Two computer cabinets are shown at 5 and 6 which incorporate computing equipment which, for the engine being simulated, will provide realistic operation of the jet engine model in the display console 1, as well as provide accurate representations on the instruments schematically indicated in FIG. 1.

The jet engine display console 1 is shown in part in FIG. 2 and the description of its appearance and function is deferred until FIG. 2 is considered. It will be apparent, of course, that the jet engine display console 1 must be connected to the computer cabinets 5 and 6 by suitable cables which are not shown, but which correspond to cables 10, 11 and 12 leading from the various control and indicating elements to the computer cabinets. The pilots' station 2 might be more appropriately called the pilot's and co-pilot's station, since it represents some of the controls made available to both the pilot and the co-pilot and presents on its face at 15 and 16 a plurality of operational instruments and warning lights such as a pressure ratio indicator, an exhaust temperature indicator, a tachometer and a fuel flow indicator. No attempt has been made herein to set forth in detail the construction of the pilots' station, since its construction will vary from one jet aircraft to another. Suffice it to say that it should include all the indicators, warning lights, operational instruments and control devices which are necessary to properly simulate the operation of a single jet engine with a mock up of suitable elements to represent any other engines in the aircraft being simulated.

The system's engineer's station at 3 closely resembles that found in actual aircraft. It includes panels at 17 and 18 upon which are mounted a number of operable controls, instruments and indicator lights such as an oil quantity indicator, an oil pressure indicator, an oil temperature indicator, a fire test panel, an external power switch, a fuel system pressure indicator, a fuel pressure warning light, a water quantity indicator, and other instruments, controls and lights. Many of the other instruments which will normally be present on the stystem's engineer's station are provided in the trainer as non-operable dummies, representing engines the operation of which are not simulated, these inoperable instruments and indicator lights being mocked up in such a way that they can later be replaced by operable units, if desired. Pointers on the dummy indicators can be moved by turning control knobs remote from the instruments if greater realism is desired.

An instructor may be stationed at a unit 4 which is called the instructor's station and which includes on its panel 20, all the controls necessary to simulate a wide variety of normal and abnormal conditions. This unit, like all of the other units, is portable which permits the instructor to have clear observation of all the students and stations and allows for convenient classroom or cockpit type arrangements. By means of the controls on panel 20, the instructor may duplicate normal operations of the jet engine, causing the model at 30 in the jet engine display console 1 to go through normal cycles of operations. For the benefit of pilots, mechanics, and trainees, the instructor is also able to simulate failures and near failures with the controls on panel 20. Many of these failures or near failures are of such a nature that they could not be duplicated on an actual engine without damage or loss of expensive equipment. As examples of the controls available to the instructor, he may adjust the controls to vary the air pressure, the oil pressure, the oil temperature, the exhaust gas temperature, simulate a hung start, simulate the overboard bleed valve is stuck, simulate a hot start, overheat the engine, vary the altitude, vary the inlet icing, vary the pressure ratio, control the sound being generated to correspond to the characteristics being simulated or simulate a flame-out.

The computer cabinets indicated by blocks at 5 and 6 enclose electronic simulating devices, such as analog computers of well known types, which are able to take the signals supplied from the pilots' station, the system engineer's station and the instructor's station and operate upon those signals in accordance with the equations which describe the characteristics of a jet engine, or of the particular engine, to provide a set of control signals. The control signals can then be used to operate and illuminate the model in console 1 as well as to provide appropriate indications of the effects which would be produced by such control signals to an engine on all of the appropriate instruments appearing at 31 in the jet engine display console and on panels 15, 17, 18 and 20. The computer elements contained in the cabinets 5 and 6 are not in themselves considered to constitute a part of the instant invention and could be replaced by any comparable equipment capable of performing the same functions.

Turning now to FIG. 2, there will be found a perspective view of the jet engine model indicated roughly at 30 in FIG. 1 and of the instruments on the panel 31 of FIG. 1. The engine represented by the drawing of the model in FIG. 2 would correspond to the number three engine of a four-engine jet transport such as a Douglas DC–8, and would be connected to controls and instruments such as are illustrated in FIG. 1 and to computer cabinets such as 5 and 6, illustrated in FIG. 1. As a consequence, the controls and instruments of this engine number three are functional, but the controls shown for the other engines are inoperable. Instruments for engines 1, 2, and 4 are marked up in the same size and appearance as the active instruments of engine number three. The position of the pointers on these dummy indicators are variable, being mechanically coupled to master control knobs located on the panels for each set of instruments. In addition to the model of FIG. 2, and the various instruments described in connection with FIG. 1 and FIG. 2, the sounds normally encountered in the DC engine are reproduced in the trainer by well known means which are coupled to the computer cabinets and not illustrated. The majority of the engine characteristics, of the number three engine, are electronically computed and activated.

The internal chambers of the engine, which are exposed in the cut-away model of FIG. 2, are illuminated by concealed banks of colored lights. The intensity and color characteristics, or attributes, of these lights are servo-controlled to portray realistic variations in the pressure, temperature, and other conditions, or effects, within the engine. Pressure is indicated by the intensity of the light, and temperature is indicated by the shade of color. Prior to starting, the engine areas will be a light green color to represent a normal airport atmospheric pressure. When the starter at 252 is operated, the green color in the compressor sections, indicated generally at 202 and 204, will progressively deepen in shade and change to a blue (also of a deep shade) from the compressor inlet to the aft end of burner cans at 214 and 216 to represent build-up of air pressure. These blue and green lights may be supplied by light sources such as are indicated at 206, 207, 208 and 209 which may be operated through filters such as those shown at 206', 207', 208' and 209'. Filters 206' and 209' may preferably be green and filters 207' and 208' may preferably be blue. The lamps indicated, as well as the other lamps behind the filters may be varied in brightness to accomplish the shift from one color to another and to change the shade of the light as well. As air is simulated to pass through the chambers of the combustion and turbine sections of the engine, a red color from light sources such as 210 and 211 and filters 210' and 211', which is present at these locations, will deepen to reflect a rise in temperature. As the starter is actuated, a high intensity blue-white light representing igniters, will glow intermittently in the combustion chambers at 214' and 216'. When the engine starts, engine combustion is displayed by a vivid red glow which starts within the combustion chambers at 218 and 220 provided by light sources 218' and 219' which cause a reflection from painted flames at F-1, F-2, F-3 and F-4 and by a less brilliant red glow from light sources 210 and 211 which gradually deepens and extends into the turbine and tail pipe section containing the thrust reverser clam shell 238 and noise suppressors. As the engine speed increases, the blue and red colors will deepen in shade and in intensity to denote increasing temperature and pressure.

It will be recognized, of course, that the intensity of the light may be varied simply by varying the amount of current in the light sources at 206, 207, 208, 209, 210 and 211 and that the colors might be deepened by shifting the position of the filters 206', 207', 208', 209', 210' and 211' so that the light might be filtered by a deeper colored filter. The means for controlling the brilliance of the light and its brightness are not shown herein, but it will be recognized that the brightness of the lights may be varied by a potentiometer or other potential varying device and that the shading of color may be provided by filters made movable by mechanical transports where the filters involved may be a film with a suitably colored emulsion. The shades of green and blue produced may be varied also by providing green filters at 206' and 209' along with blue filters at 207' and 208' and varying the relative amount of light through each filter to change from green to blue and to vary the shades of the resulting colors. The red coloring may be changed in shade and intensity through different filters at 210' and 211' and variations in brightness in 210 and 211.

Other conditions, or effects, which are shown by changes in lighting should be noted. Among these is the effect of bleed air on the compressors, which is represented by a blue glow in the simulated overboard bleed valve at 226, when it is simulated to be open. The light source for providing this blue glow is not shown because of the limited space for illustration. Opening this overboard bleed valve also causes the shade of blue or green in the compressor sections 202 and 204 to lighten and thus to demonstrate the loss of pressure due to the bleeding of air from the compressors. The operation of other simulated components such as the anti-ice bleed valve at 228 provide other lighting effects. The anti-ice bleed valve 228 is inserted in the anti-ice bleed line 227 which consists, in the trainer, of a neon tube which is illuminated by a blue light when the turbine is "warmed up." When this valve is simulated to be "open," the anti-ice bleed line 229 leading from the valve to the inlet guide vanes 231 and 232 is illuminated by a pale blue light indicating "bleed off" of warm air. The anti-ice bleed line 229 in the simulator is, of course, another neon tube or other suitable illuminating source such as an electro-illuminescent device which may be turned "on" or "off." This warm air in an operating jet engine would be used to melt ice building up in the inlet guide vane area. In the simulator this situation is represented by the "ice" at 233 which will appear to increase in quantity or to melt depending upon whether conditions for forming ice are being simulated or conditions to cause ice to deplete, as by the application of compressor bleed air, are being simulated. The light at 234 is such as to enhance the effect of "ice" at 233.

The effect of the thrust-reversing system on exhaust gas flow is shown by a movable reverser very similar to the installation on an actual jet engine. This reverser consists of a thrust-reverser clam shell at 238 which is illuminated by a light source 240 in such a way that when the thrust-reverser clam shell is moved to a position such that it would cause reverse thrust in a jet engine, the light beam 241 from light 240 will be reflected back towards the exhaust cone at C-10 to create the illusion that the gases have been deflected. The clam shell 238 will be operated by means not shown, as if a mock-up of the thrust reversing cylinder at 239 were operable, in response to a pilot's command for reverse thrust.

The dynamic air flow, fuel air mixtures and exhaust gases are displaced as moving through the engine by the introduction of paint at various stages. The paint is applied in a series of helical stripes at 244, 246, 248 and 250 somewhat in the manner of paint applied to a barber pole, so that when the engine is rotated, the eye will be led along the painted stripes and the optical illusion will be created that gas is moving past the compressor and turbine. This effect is greatly enhanced by the fact that the colors applied at 244, 246, 248 and 250 are such that they do not show up well until the lights at 206, 207, 208, 209, 210 and 211 are on and by the further fact that the paint tends to become more and more evident with more increased brightness, which thus further enhances the illusion that gases are flowing by as the speed of rotation of the engine is increased with increased pressure and temperature.

A pneumatic starter for the engine number three is indicated at 252 and its accessory gear case and oil pump assembly is shown at 254. Connecting the assembly 254 to the compressor C-4 is a gear train including elements 253, 257 and 259 which are operable whenever the jet engine turns over. It will be noted that the starter is sectioned to permit the student to observe the working elements therein and it should be recognized that this portion will be illuminated by light from a source such as 255, whenever the starter is operated. Coupled to the gear case 254 is a fuel control device (not animated) at 256 and connecting to the fuel control device are a plurality of lines at 258 and 260, which, in the trainer consist preferably of neon tubes which may be lit to represent the application of fuel control. Line 258 in particular is the fuel control inlet pressure line and line 260 is the high pressure return line. Line 262, which is also represented by a neon tube which may be lit up is called the fuel control to pressure valve line and it is coupled to the fuel pressurization and dump valve at 264 through which it may be coupled to the overboard dump valve line 266, to the pilot's fuel flow from the dump valve line at 268, or to the main fuel flow from the dump valve line at 270. The terminals of these lines at 266, 268 and 270 are shown in the cut-away of the fuel pressurization and dump valve 264. Each of these lines is indicated by a separate light which is illuminated when it is simulated to be connected to line 262. A neon tube representing the fuel pump inlet pressure line is shown at 272. A non-operating mock-up of the engine fuel pump is shown at 274.

Two neon tubes 276 and 278 are illustrated at the upper portion of FIG. 2 to represent respectively a bleed airline and a diffuser water line. Each of these tubes will be lit up in response to computer signals to indicate whenever pressure has been applied thereto. The bleed airline 276 may take air under pressure from the turbine near the burner to operate the cabin compressor (not shown) from the turbo-compressor. Other neon tubes which will be lit at appropriate times to represent the operation of particular lines are 282 and 284 representing respectively the inlet water line and the water available line.

The mechanical structure of the primary elements of the jet engine are shown in the scale model in considerable detail with a number of portions cut away to enable students to observe the inner construction. Main bearings to support the rotor are shown cut away at B-2, B-4, and B-6 to show their construction and lubrication principles. A shaft S-2 is shown which may be conceived as running through the principal parts of the jet engine and as acting as support for the low pressure compressor C-2, the high pressure compressor C-4, the high pressure turbine T-2, the low pressure turbine T-4 and the various components mounted thereon. The compressors and turbines are run in pairs in a preferred embodiment of the trainer with the low compression elements C-2 and T-4 operating from one electric motor (not shown) and C-4 and T-2 operating from another electric motor (not shown). The speeds of each pair of elements, of course, is accurately controlled by the computer elements referred to previously in connection with FIG. 1. It will be noted that the low compression compressor and the high compression compressor appear to support only a small number of reaction vanes, but it will be appreciated that the entire surface of each of these compressors is populated with rows of such vanes or blades, which are sometimes known as stators or paddles, and that only a few are shown in the drawing in order to make it possible for the colored sections appearing on the faces of the compressors to be more accurately depicted.

Adjacent to the bearing B-4 is the accessory take-off drive shaft 253, which shows, in principle, a method for obtaining power from the compressor for driving accessories. This shaft also acts as the compressor drive for starting the engine. The oil tank shown at T-2 is not animated, but a section is shown so that the oil content may be indicated and the tank lines to the oil pump are illuminated to show oil content. Varying oil pressures are indicated by varying intensity of light. Visual indicators are shown from the panel 31 of FIG. 1 at I-1, I-2, etc. These indicators are connected to the computer elements shown in cabinets 5 and 6 of FIG. 1 and provide a visual display of such values as simulated static air temperature, simulated ram air temperature, and simulated speed.

As has been indicated, the various signals provided by the pilot and co-pilot, the instructor and the flight engineer are supplied to the computer in the cabinets labelled as 5 and 6 in FIG. 1 and after suitable computations have been performed, new signals indicative of the conditions of the jet engine are supplied to the appropriate instruments, to the appropriate light providing elements and to the motion and noise generating equipment. A small block diagram is shown in FIG. 3 which indicates the interrelationships of some of the elements of the trainer. It should be recognized that when either the pilot, the co-pilot, the instructor or the engineer elects to make a change in the controls, that the result will be shown on appropriate instruments as well as by changes brought about on the model of the jet engine. It will also be understood that similar instruments, for registering the same function on a plurality of different instrument panels will be forced by servo systems to read the same way, just as all of the identical instruments appearing in an airplane at different stations would simultaneously read the same values.

Having set forth the general nature of this invention, we turn now to consideration of the simulation of a number of individual effects such as the generation of flames and the simulation of motion of fluids in a pipe. The flames F-1, F-2, F-3 and F-4 of FIG. 2 may be simulated by solid elements which are painted with suitable colored materials so that they appear to glow or fluoresce in the manner of flames. This approach represents the simplest possible and is shown in FIG. 2. If a greater degree of realism in the appearance of the flame is desired, however, other approaches may be suggested, such as that shown in FIG. 4 in which the flame at F-400 is composed of some strong flexible material secured in a tube T-400 at a point such as 400. In this construction, air from a source such as 402 is supplied to the tube T-400 at an angle such as to produce considerable turbulence, designated by curled lines such as 404 and 406. This turbulence, when properly directed, will transmit an undulation to the material making up the flame F-400 which will cause it to appear to waver or flicker in the manner of a flame. An ultraviolet light source may be supplied such as is indicated at 408, which, when directed toward flame F-400 will illuminate it and cause suitably applied fluorescent materials to glow brilliantly, thus simulating the appearance of a flame with great realism. It may be necessary to cut the illumination reaching the area around the flame of FIG. 4 to heighten the effect of a flame.

The flame as simulated by the apparatus of FIG. 4, while appearing very realistic, requires the introduction of an air supply and an ultraviolet light source, thus imposing new requirements on the trainer which may not entirely justified by the effect produced. Therefore, the embodiment of a flame shown at FIG. 5 may be more desirable, wherein the flames are represented to be in the burner can 500 at F-502 and F-504. Each of these flames may be rotated by a motor shown at M-500 through gearing at 502, 504 and 506, which can cause the two flames to rotate rapidly and thereby introduce the illusion of a fluctuating flame. This effect, though unrealistic in a jet engine, will nevertheless impress the observer with the importance of providing a heat source. The flames F-502 and F-504 may be illuminated by an ultraviolet light source such as that indicated at 508, and may be painted at different zones indicated at 510, 512 and 514 on F-502 by different colored fluorescent paints which will provide a realistic glow when the ultraviolet light source at 508 is turned on and the flames are made to rotate by the action of the motor M-500. The red spot light indicated at 520 is intended to induce a red glow within the burner can 500 when the flames are simulated to be in operation. The dots appearing in the can 500 represent paint which increases the red glow under the action of the ultra-violet light at 508. The dummy igniter at 516 also glows and may be rotated to increase the variations in the glow if desired.

Turning for a moment from the simulation of flames, we find that FIG. 6 shows means for simulating the flow of pressure or liquids or gases in a tube which may be more desirable under some circumstances than the use of simple neon tubes or other devices which only glow and may not be readily controlled to any extent to indicate variations in flow. The apparatus of FIG. 6 involves the use of a film such as that shown at 600 upon which may be placed a number of dots or in which a number of holes may be punched, each of which will be visible through a transparent cover at 602, or show up as moving shadows such as 605 on a translucent curved cover at 602, when they are illuminated by low intensity light sources as indicated at 604 and 606. The film may be mounted on suitable transporting spools such as those at 610 and 612. The spool 610 may be a power spool driven by a motor M-610 operating from an A.C. or D.C. power supply and 612 and other supporting spools may be idlers. The speed of the motor may be controlled by any suitable means so that the film 600 will be transported through the simulated tube 602 at a speed proportional to the speed of flow of the gas or liquid and thereby provide additional visual cues to create a sense of a realistic portrayal of a jet engine to the observer. It will be recognized that for this system of simulating the flow of gaseous and liquid substances to be effective the speed of the motor must be tied in to the computing elements, to other indicators of flow, and to other indicators of varying rates such as the actual rate of motion of the corresponding compressors and the turbines. It will be recognized that this additional degree of realism may be imparted to the visual aspects of the trainer by the computer as envisioned with respect to FIGS. 1, 2 and 3.

Considering again the question of flames and their appearance, we turn to FIG. 7 which illustrates a simple form of flame which may be placed directly in the position of the flames F–1, F–2, F–3 and F–4 of FIG. 2, with the addition of suitable coloring such as will be described in connection with FIGS. 8A and 8B. The flame envisioned in FIG. 7 consists of a flat portion 700 which is cut in the more or less irregular pattern shown in the figure to represent the general outline that a flame may take a given moment. It would generally be sharply pointed at one end indicated at 702 with edges at 704 and 706 which taper back to flat portions at 708 and 710 which are connected to a shank at 712 which may be mounted fixedly to a stationary portion or may be mounted in a chuck for rotation in the fashion already described in connection with FIG. 5. It will be recognized that the body of the flame at 700 may be painted with some paint giving a hue or color of high saturation and medium brilliance in order to provide a bright glow indicating a flame. Particular variations of painting are shown in FIGS. 5 and 8A and 8B.

Figure 7:
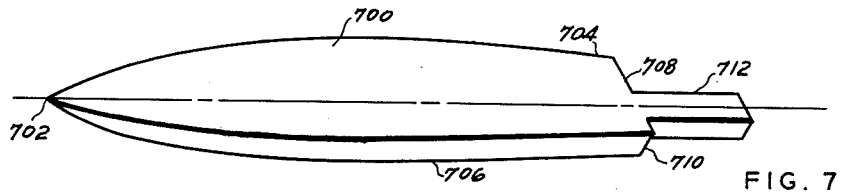
Figure 8A:
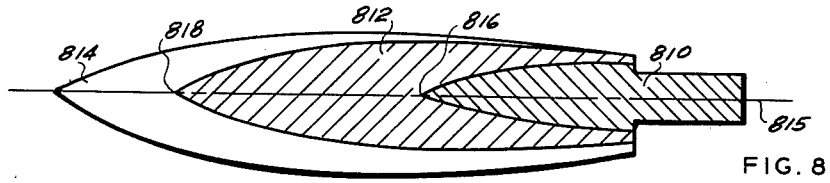
Figure 8B:
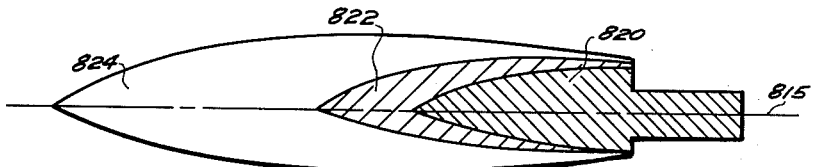

The opposite sides of an exemplary flame such as that in FIG. 7 is shown in FIGS. 8A and 8B and the application of particular paints to the flame are shown at 810, 812 and 814 in FIGS. 8A and at 820, 822 and 824 in FIG. 8B. The colored paint applied on areas 810 and 820 may be the same and in one embodiment of this invention consisted of a deep blue in hue, of high saturation and relatively low brilliance. The point of the area 810 indicated at 816 preferably lies along the center line of the flame designated 815. A white area may be applied to the area at 812 consisting of flat white paint, said paint diffusing the rays of light reflected from it in many directions and forming a pattern coming to a point at 818 which lies on the center line 815. The paint applied on the area 814 would preferably be a fluorescent paint, red in hue, of medium brilliance and high saturation. The coloring in FIG. 8B corresponds to that in FIG. 8A, where area 820 is blue, area 822 is white and area 824 is red. The flame shown in FIGS. 8A and 8B might be mounted in a stationary position and radiated with suitable light to provide some of the characteristics of a flame, but it may also be mounted in a rotating chuck such as that used to mount the simulated flames of FIG. 5. Rotation provides a very definite flicker which may be varied by varying speed under light sources of varying intensity in order to provide apparent changes in the amount of heat being generated by the flame along with changes in the brightness thereof.

Figure 9A:
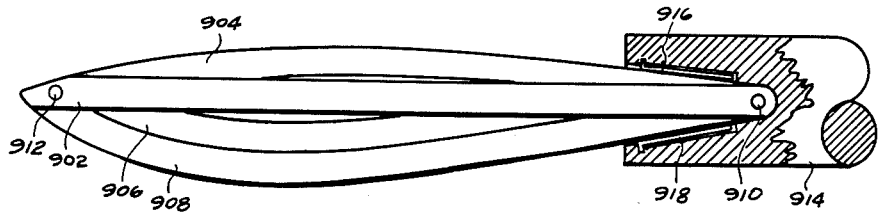
Figure 9B:
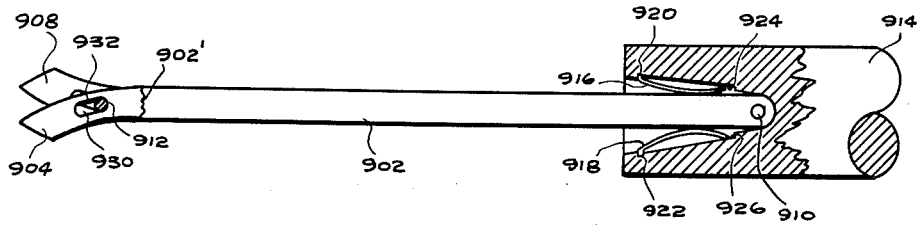

Still another version of the flame may be used such as that shown in FIGS. 9A and 9B. This latter flame is particularly desirable where it is thought that the flame should completely disappear at certain times. In this case the disappearance is simulated by the use of a band-like structure which expands to occupy an area like a flame when desired and may be caused to contract to present just a very narrow edge which may be easily disguised. Considering first the flame as it appears in FIG. 9A, it will be observed that it is composed of several portions which may be labeled 902, 904, 906 and 908 which are pivoted together at one end on a short pin 910 and at the other end on a short pin at 912. The pins 910 and 912 are designed to permit the units 902, 904, 906 and 908 to rotate freely upon them, but to retain the elements in alignment. A supporting shaft at 914 is shown partially in section to permit one end of the flame to be visible as well as the end of pin 910 and to show the construction of the other means supporting the flame. The shaft 914 may of course be placed in a chuck for rotation as was indicated in FIG. 5. Springs are indicated at 916 and 918 which have been pushed flat by the expansion of the flame elements as shown in FIG. 9A due to centrifugal forces acting during rotation on the elements 904 and 908. It will be appreciated that the elements 904, 906 and 908 are made of flexible material which is of sufficient weight that under conditions of rotation it would tend to deform in the manner shown in FIG. 9A against the springs 916 and 918, but that when the shaft 914 is held stationary the springs 916 and 918 will force these elements to line up together as shown in FIG. 9B. The springs 916 and 918 are held in place by slots at 920 and 922 into which tabs of the springs may be fitted while the opposite ends of the springs are allowed to slide freely against slots 924 and 926 in the shaft 914. In FIG. 9B a portion of the flame 902 is cut away beyond the line 902′, proceeding toward pin 912, to expose the slots 930 and 932 and the units 904 and 908 respectively which are designed to permit the outward motion of the units 904 and 908 when centrifugal forces are applied. A similar slot in unit 906 has not been diagrammed since the attempt to include it at this point would only lead to confusion in the drawings, but its existence will nevertheless be recognized. Paint will be applied to the units 902, 904, 906 and 908 and these units will be illuminated by a suitable light source such that the required brilliance of the flame and variations of color will be provided. The relatively thin line presented by the unit 902 to the observer when the flame is closed up as shown in FIG. 9B will be very unobtrusive in comparison with the open flame of FIG. 9A especially if the inner face of the can is painted with similar paint. With the decrease in the level of illumination which will attend the burning out of the simulated flame in a trainer, the flame and the can will tend to blend even more until the flame virtually disappears. This apparent disappearance will occur in the trainer whenever a "flame-out" is simulated, fuel is exhausted or the flame is "extinguished" for any other reason.

Having described in detail certain preferred embodiments of the present invention, we turn now to a description of operation. It will be recognized that in aircraft trainers generally, and in the instant invention in particular, it is highly desirable that every possible detail of operation of the aircraft and/or the engine should be duplicated in so far as that is possible with a grounded trainer. To this end the various consoles as illustrated in FIG. 1 provide a complete set of realistically arranged instruments and control devices which are interconnected to the computing cabinets 5 and 6 and to the jet engine in cabinet 1 in such a way that the simulated engine will operate in the normal manner only upon the occurrence of the setting of the proper controls by the pilot, the copilot and the engineer while the instructor at the same time refrains from providing signals from his control devices such as to simulate the existence of conditions of failure or of malfunction.

In order to simulate the start of the engine, assuming that the trainer is in condition to be operated, the instructor must first set his controls to a state permitting normal operation. The flight engineer then must undertake each of those steps which would be necessary to introduce external power into an aircraft by operating appropriate switches, such as the "external power switch," the "bus power switch," "D.C. bus tie switch," and so forth until all of the necessary connections have been made for external power. The proper connection for fuel must then be made by selection of the appropriate fuel tank such as the "main tank" or the "alternate tank" and the corresponding "boost pump" must be placed in the "on" status. Having provided for external electrical power and for fuel a number of other settings are required such as turning the cabinet compressor switches "off" after which time the starter indicated as 252 in FIG. 2 may be operated to turn the engine over. At the time the starter commences to operate the ignition switch will, of course, have to be turned before the ignition will start and the ignition will be represented by flashing in the burner cans from the light sources at 214' and 216' of FIG. 2.

At this point it is possible for the instructor to operate elements in his controls which will cause the ignition to fail which will then prevent the trainer from simulating a complete start. It should be noted also that in a preferred embodiment of the invention a pale green light will be provided on the compressor portion of the circuit since it has been arranged to commence shining at the moment the trainer engine has been prepared to be started. The igniters represented by flashes in the burner or diffuser cans will continue to flash approximately once every one or two seconds for a maximum of 16 seconds. During this period the engine will "start"; assuming that the preceding conditions are all fulfilled and no "ignition failure" or other failure or malfunction is inserted by the instructor.

After the engine starts, the igniters at 214' and 216' will continue firing until a full 16 seconds has passed to ensure that it continues to operate. The computed parameters will increase to show the engine condition as it accelerates to its idle r.p.m., a condition which is represented by increasing speed of the rotors indicated in FIG. 2, increasingly more deeply shaded colors on the compressors and on the turbine portions of the trainer and the lighting up of appropriate neon tubes. The starter is automatically deactivated at approximately 34% of the normal operating speed of the engine.

Normal engine shut down procedures must also be followed involving turning the throttle to idle, checking the instruments, turning off the fuel boost pump, turning off the generator and compressor switches, and by running through the proper sequence of the fuel selector lever to "off." In the engine shut down steps the student may be taught to observe the run-down to determine that the engine is decelerating freely and also to check all instruments after a shut-down. During the shut-down stages, the simulated engine in FIG. 2 will gradually decelerate in speed, the lights in various neon tubes will go out, and the light available on the compressor stages will gradually turn from a deep blue through a lighter blue and green to a pale green, while the red in the combustion chambers and on the turbines will gradually turn paler until such time as the engine has been stopped and is assumed to have cooled off following the above steps and the lights, except the pale green indicating atmospheric pressure temperature, will go out indicating that the engine is completely dead.

The instructor's control panel shown at 20 in FIG. 2 has, in a preferred embodiment of the instant invetnion, thirty-one control devices which enable the instructor to assume charge of the simulated engine at all times, as well as enabling him to introduce conditions into the trainer representing various failures such as a "hot start" or "ignition failure," and to introduce certain other malfunctioning signals such as "engine overheating" or "thrust reverse failure." The primary purpose of the instructor's control panel, of course, is to enable him to set up and control the various problems which may be presented on the trainer from training students in normal start-ups and shut-down of the engine, as set forth above, to training in what to do in an emergency and to the general training designed to teach students how to recognize normal functioning, malfunctioning, failures and what steps should be taken to overcome these malfunctions and failures, whether they be immediate emergency measures or steps to overhaul the engine.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described our invention, what we claim as new and desire to secure by Letters Patent is:

1. In an aircraft jet engine simulator, visual display means comprising a cut-away model of a jet engine to be simulated, means for illuminating portions of said model, means for varying a plurality of the attributes of the illumination of said portions, in accordance with a corresponding plurality of conditions of operation in said portions, means including a plurality of instrument displays representing the instruments associated with said jet engine, and means for controlling said instrument displays to represent said changing conditions of operation of said jet engine, said portions and said instrument displays being arranged to be viewed substantially simultaneously.

2. In an aircraft jet engine simulator, visual display means comprising a cut-away model of a jet engine to be simulated, means for illuminating regions of said model, mans for varying a plurality of the attributes of the illumination of said regions in accordance with a corresponding plurality of conditions of operation in said regions, means for rotating portions of said model at speeds proportional to the speed of said jet engine under varying circumstances, means for controlling said speeds to represent said changes in the operation of said jet engine, means including a plurality of instrument displays representing the instruments connected to said jet engine, and means for varying the readings of said instrument displays to represent said changes in the operation of said jet engine, said regions and said instrument displays being arranged to be viewed substantially simultaneously.

3. In an aircraft jet engine simulator, visual display means comprising a cut-away model of a jet engine to be simulated, means including rotary portions of said model representing a compressor and a turbine, means for varying the speed of rotation of said compressor and said turbine, means for illuminating said model, means for varying characteristics of the illumination on said compressor and on said turbine to represent changing conditions of operation of said jet engine, means for synchronizing said means for illuminating and said means for varying the speed to provide the most light at the time of maximum speed, means including a plurality of instrument displays representing the instruments associated with said jet engine, and means for operating said instrument displays to represent said changing conditons of operation of said jet engine the simulator being so arranged that said instrument displays and said illumination may be viewed substantially simultaneously.

4. In an aircraft jet engine simulator, visual display means comprising a partially cut-away three-dimensional model of a jet engine to be simulated, means for illuminating portions of said model, means for varying a plurality of the attributes of the illumination of said portions in accordance with a corresponding plurality of operating conditions in said portions, means including a plurality of instrument displays representing the instruments connected to said jet engine, means for controlling said instrument displays to represent said changes in the operation of said jet engine, movable means forming a part of said model representing the compressor and the turbine of said jet engine, and means for rotating said movable means at a speed proportional to the speed of operation of said jet engine.

5. In an aircraft jet engine simulator, visual display means comprising a partially cut-away three-dimensional model of a jet engine to be simulated, means for illuminating said model, first computer means for varying the color characteristics of the illumination of said model to represent changing conditions of operation of said jet engine, means including a plurality of instrument displays representing the instruments of said jet engine, second computer means for controlling said instrument displays to represent said changing conditions of operation of said jet engine, means providing for the animation of a movable portion of said model representing the compressor and the turbine of said jet engine, third computer means for rotating said movable portion at a speed proportional to the speed of operation of a jet engine, and hand operable signal means representing the controls of a jet engine to provide input signals to said first, second and third computer means.

6. In an aircraft jet engine simulator, visual display means comprising a cut-away model of a jet engine to be simulated, means for illuminating said model, means for varying the illumination of said model to represent changing conditions of operation of said jet engine, color control means for changing the color of the illumination to illustrate the stages of operation of said jet engine, said color control means varying the color from a pale color indicating atmospheric pressure at the intake of the compressor to a deep color indicating greater pressure at the outlet of the compressor and providing a like variation of another color in the turbine portion to indicate variations in temperature and pressure due to combustion, means including a plurality of instrument displays representing the instruments for determining the conditions of operation of said jet engine, and means for operating said instrument displays to represent the changing conditions of operation of said jet engine.

7. In an aircraft engine simulator, visual display means comprising a cut-away model of a jet engine to be simulated, means for illuminating said model, means for varying the illumination of said model to represent changing conditions of operation of said jet engine, color control means for changing the color of the illumination to illustrate the stages of operation of said jet engine, said color control means varying the color from a pale color indicating low air pressure at the intake of the compressor to a deep color indicating greater pressure at the outlet of the compressor and providing a like variation of another color in the turbine portion to indicate variations in temperature and pressure due to combustion, means for rotating portions of said model at speeds proportional to the speed of said jet engine under varying circumstances, means for controlling said speeds to represent changing conditions of operation of said jet engine, means including a plurality of dial displays representing the instruments normally connected to said jet engine, and means controlling said dial displays to represent the changing conditions of operation of said jet engine.

8. In an aircraft jet engine simulator, visual display means comprising a cut-away model of a jet engine to be simulated, means for rotating portions of said model representing a compressor and a turbine, means for illuminating said model, means for varying the intensity of the illumination of said model to represent changing conditions of operation of said jet engine, color control means for changing the colors of the illumination, said color control means varying the color from a pale color to indicate atmospheric air pressure in the compressor of said jet engine when said compressor starts to move slowly to a deep color indicating a rise in pressure with higher speeds of rotation of said compressor and providing a like variation of another color to indicate variations in temperature in the turbine due to combustion, means including a plurality of instrument displays representing the instruments of said jet engine, and means for operating said instrument displays to represent the changing conditions of operation of said jet engine.

9. In an aircraft jet engine simulator, visual display means comprising a cut-away model of a jet engine, movable elements in said model, said movable elements of said model representing a compressor and a turbine, means for rotating said movable elements, means for illumianting said model, means for varying the intensity of the illumination of said model to represent changing conditions of operation of a jet engine, color control means for changing the colors of the illumination, said color control means varying a first color from a pale tint to indicate low pressure and temperature in the compressor of said jet engine while said compressor moves slowly to a deep shade indicating higher pressure and temperature accompanying higher speeds of rotation of said compressor, means for providing a like variation of a second color to indicate variations in pressure and temperature in the turbine due to combustion, means including a plurality of instrument displays to illustrate the conditions of operation of a jet engine, control elements representing the controls of a jet engine, and means for synchronizing the colors in the simulated engine with the speed of rotation of the movable elements of the simulated engine and with the readings provided on the instrument displays in response to control signals supplied from said control elements.

10. In an aircraft jet engine simulator, a visual display means comprising a cut-away model of a jet engine to be simulated, means for illuminating portions of said cut-away model, means for varying a first color attribute of the illumination of said portions in accordance with a first operating condition occurring at said portions, and means for varying a second color attribute of the illumination of said portions in accordance with a second operating condition occurring at said portions.

11. In an aircraft engine simulator, visual display means comprising a cut-away model of a jet engine to be simulated, portions of said model representing rotating portions of said engine, means for varying the speed of said portions of said model, means for illuminating said model, and means for varying a plurality of the attributes of the illumination of said model in accordance with a plurality of operating conditions of said engine.

References Cited in the file of this patent
UNITED STATES PATENTS

| | | |
|---|---|---|
| 1,925,040 | Lindberg | Aug. 29, 1933 |
| 2,008,634 | Aird | July 16, 1935 |
| 2,741,037 | Devoe | Apr. 10, 1956 |
| 2,882,615 | Dawson | Apr. 21, 1959 |
| 2,930,226 | Spalding | Mar. 29, 1960 |